United States Patent [19]
Niyogi et al.

[11] Patent Number: 6,144,755
[45] Date of Patent: Nov. 7, 2000

[54] METHOD AND APPARATUS FOR DETERMINING POSES

[75] Inventors: Sourabh A. Niyogi, Cambridge; William T. Freeman, Acton, both of Mass.

[73] Assignee: Mitsubishi Electric Information Technology Center America, Inc. (ITA), Cambridge, Mass.

[21] Appl. No.: 08/729,600

[22] Filed: Oct. 11, 1996

[51] Int. Cl.$^7$ ...................................................... G06K 9/00
[52] U.S. Cl. .......................................... 382/118; 382/226
[58] Field of Search ................................ 235/380; 348/2, 348/77, 414, 418, 422; 382/115, 118, 157, 224–227, 253, 100, 103, 107, 218; 704/222

[56] References Cited

U.S. PATENT DOCUMENTS

| | | | |
|---|---|---|---|
| 5,255,090 | 10/1993 | Israelsen | 348/417 |
| 5,642,431 | 6/1997 | Poggio et al. | 382/118 |
| 5,754,939 | 5/1998 | Herz et al. | 455/4.2 |
| 5,764,790 | 6/1998 | Brunelli et al. | 382/118 |
| 5,835,616 | 11/1998 | Lobo et al. | 382/118 |
| 5,983,251 | 11/1999 | Martens et al. | 708/203 |

OTHER PUBLICATIONS

Pentland et al., View–Based and Modular Eigenspaces for Face Recognition, Proceedings 1994 IEEE Computer Society Conference on Computer Vision and Pattern Recognition, p. 84–91, Jun. 1994.

Rabbani et al., Digital Image Compression Techniques, p. 146–151, 1991.

Tou et al., Pattern Recognition Principles, p. 169–170, 1974.

Kim et al., DCT–Based High Speed Vector Quantization Using Classified Weighted Tree–Structured Codebook, IEEE, 1996, pp. 935–940.

El–Sharkawy et al., "Suband Image Compression Using Wavelet Transform and Vector Quantization", Purdue University, IEEE 1997, pp. 659–662.

Chang et al., "Image Sequence Coding Using Adaptive Tree–Structured Vector Quantization With Multiple Searching", Internation Conference, Acoustics, Speech, and Signal Processing, IEEE 1991, pp. 2281–2284.

Proceedings, IEEE CVPR, 1993, "Recursive Estimation of Structure and Motion Using the Relative Orientation Constraint", by Messrs. Azarbayejani Horowitz and Pentland.

Tracking Facial Motion, IEEE Computer Society, 1994, Proceedings of the Workshop on Motion of Non–rigid and Articulated Objects, pp 36–42, by Messrs. Esa, Darrell and Pentland.

*Primary Examiner*—Jon Chang
*Assistant Examiner*—Jayanti K. Patel
*Attorney, Agent, or Firm*—Dirk Brinkman

[57] ABSTRACT

A method and apparatus are disclosed for determining a direction in which a subject's head is facing. The present invention has particular relevance to monitoring driver conditions in automobiles. By monitoring head positions and motions, the system can estimate driver awareness. Signals or alarms can be activated if the driver does not appear to be aware of driving conditions. The present invention provides a rapid, low cost device for determining pose position, which would be useful in automobiles. A large number of images of various subjects in different poses are stored a memory. The poses are then organized according to tree-structured vector quantization to allow comparison with a sample image of an actual driver. The tree structure is traversed to find a leaf node constituting one of the stored images which is closest to the sample image. The pose of the closest image is outputted as the pose of the sample image. Cropping can be done automatically by including, within the stored images, extra examples which are offset from center. If the closest pose is one that is offset, the cropping window for subsequent sample images is appropriately adjusted in order to maintain the head of the subject close to the center of the cropping window.

17 Claims, 2 Drawing Sheets

METHOD AND APPARATUS FOR DETERMINING POSES

FIELD OF THE INVENTION

The present invention relates to a system for determining poses of a test subject. More particularly, it relates to determining a direction the head of a driver of an automobile is facing.

BACKGROUND OF THE INVENTION

Operator error is a principal cause of automobile accidents. Different methods have been developed to alert drivers of dangerous conditions in order to prevent errors. As part of such systems, the driver is monitored to determine the driver's state, and whether the driver is paying proper attention to conditions of the road and vehicle. Typically, this is done by including a camera in the vehicle to take a picture of the driver. The picture is then analyzed to determine features and characteristics of the driver, such as whether the eyes are open and which way the driver is looking. The difficulty is in developing a system for analyzing the picture of the driver which operates with different drivers, different lighting conditions, and different driver positions.

Various techniques have been developed for analyzing images of a driver. In order to be useful, a technique must be quick and economical. It must be analyze a picture quickly in order to alert the driver of the dangerous condition and allow time for an appropriate response. In addition, it must be economical to build so that it is affordable within an automobile. Techniques which use large amounts of memory or require high speed processors are not sufficiently economical.

In a feature extraction technique, the image is analyzed to determine specific facial features of the driver. Generally, an objective is to determine the size, shape, and position of the eyes. Features are abstracted from the image based upon the light and dark areas in the image. However, with different drivers and lighting conditions, the light and dark areas, particularly around the eyes, can vary greatly. Thus, determining the feature is difficult and requires significant processing. An example of a feature determining and tracking system is illustrated in "Recursive Estimation of Structure and Motion Using the Relative Orientation Constraint", *Proceedings IEEE CVPR*, 1993, by Messrs. Azarbayejani Horowitz, and Pentland.

In another technique, templates representing face or feature structures are used in determining head position and orientation. The image is compared with the various templates to determine which one is closest. An example of a template matching system is illustrated in "Tracking Facial Motion", *Proceedings of the Workshop on Motion of Non-rigid and Articulated Objects*, pp 36–42, *IEEE Computer Society*, 1994, by Messrs. Essa, Darrell, and Pentland. The significant differences in driver images resulting from different drivers, different lighting conditions, and different appearances, makes matching with templates difficult. Furthermore, in performing the matching, significant processing is required to compare an image with each of the templates. Thus, more powerful and faster processors are required, which increases the expense.

In another technique, optical flow is used to determine positions of features and assumes small head movements. An example of the optical flow technique is shown in "Analysis and Synthesis of Facial Image Sequences Using Physical and Anatomical Models", *IEEE Pat. Anal. Mach, Intell.*, 15(6): 569–579, June 1993 by Messrs. Terzopoulus and Waters. In the optical flow technique, the sequence of images are used to follow features and determine a change in position from one image to the next. This requires fast processing so that the head movements between images are small. It also requires significant processing power in order to meet these processing speed requirements.

Thus, a need exists for a rapid and low cost image analysis system for determining head position and pose of the driver. A need exists for a system which accomodates different subjects, appearances, and lighting. A need exists for a system which does not require high speed processing.

SUMMARY OF THE INVENTION

The present invention uses a non-linear mapping technique to map a sample image to a set of output model parameters. The model parameters principally relate to pose or head position. A training set of images and corresponding model parameters is used to learn the mapping from the inputs to the outputs. Non-parametric estimation techniques, such as nearest neighbor estimation techniques, can be used for comparing the sample image to the training set images in order to determine the output parameter.

According to another aspect of the invention, a tree-structure vector quantization technique is used to organize the images in the training set in order to reduce processing time and indexing costs. Each of the images, or data points, in the training set is a leaf of the tree. When an input image is received, the tree is traversed to determine a closest data point in the training set. The output parameter of the closest data point in the training set, i.e., a corresponding pose, is outputted.

According to another aspect of the invention, in building the tree structure, k-means clustering (with K=2) is used to separate the data points iteratively into each side of the tree nodes. Alternatively, according to another aspect of the invention, principal components analysis (PCA) is used to find a direction of maximal variation for the data points assuming an n-dimensional space. The data points are then separated into halves in the direction of maximal variation.

According to another aspect of the invention, a cropping window is used to select a portion of an image in order to limit the image to the face. The training set includes images with faces offset or at different distances in order to determine adjustments to the cropping window.

DETAILED DESCRIPTION

Figure 1:
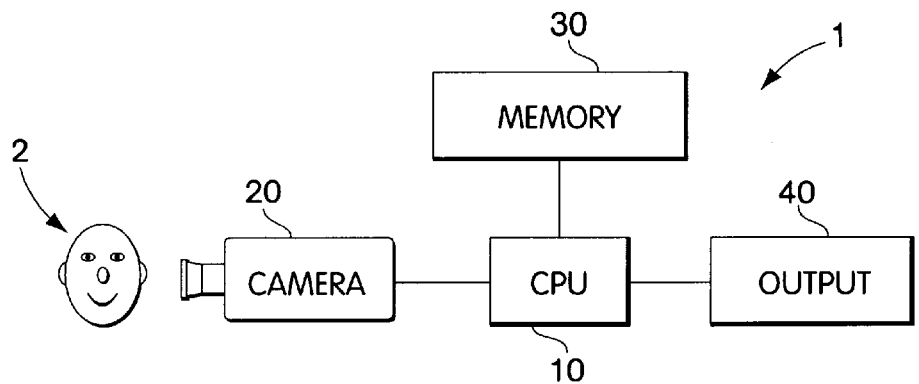
FIG. 1 illustrates hardware implementing the present invention.

As illustrated in FIG. 1, the present invention can be implemented in a system 1 including a camera 20, central processing unit (CPU) 10, memory 30 and output 40. The camera 20 is used to generate an image of a subject 2, such as a driver of an automobile. According to an embodiment of the invention, the sample image would be limited to the face of the subject. However, the sample image may include other portions of the subject, and the system may be used to determine more than just face position and direction. The camera 20 provides the digitized sample image to the CPU 30 for processing. Preferably, the camera 20 provides a series of sample images over time. Each image is separately processed to determine a pose. A memory 30 is connected to the CPU 20 to store the image data while it is processed. In addition, the memory 30 includes image data for the images from the training set and the output pose corresponding to each image in the training set. Furthermore, the program steps for operating the CPU 20 to analyze the sample image from the camera are stored in the memory 30. The CPU 20 also includes an output 40 for indicating the pose determined for the inputted image. The output 40 could be provided to other processing circuitry for determining whether a hazardous condition is present and whether to alert a driver. The use for the output depends upon the system in which the pose determining system is operating.

The pose determining system uses a training set of images as a basis for determining the pose. Each image in the training set is associated with a specific pose. The system then determines the closest image in the training set to the sample image. The pose of the closest image is outputted as the pose for the sample image. Different mechanisms can be used for generating the images in the training set.

Figure 2:
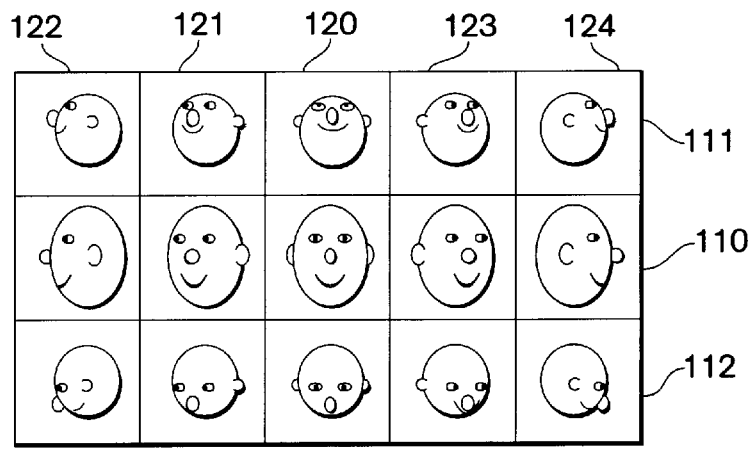
FIG. 2 illustrates different pose positions for the training set.
Figure 3:
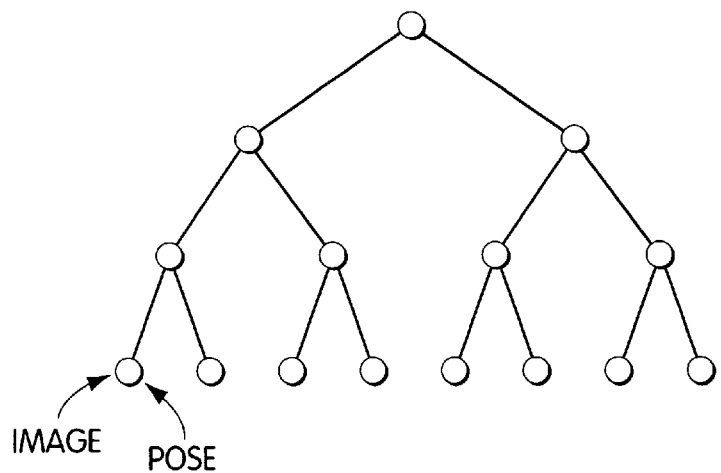
FIG. 3 illustrates the tree-structured vector quantization organization of the images in the training set.

According to an embodiment of the present invention, the training set is obtained by taking pictures of various subjects at different poses and saving them in memory 30 as images. The pose associated with each respective image is also stored. FIG. 2 illustrates a set of images at different poses for use in determing the direction the head is facing. Each row represents a vertical displacement of the pose and each column represents a horizontal displacement. For example, the subject in row 110 has no vertical tilt to the face. In row 111, the subject is looking upward and in row 112, the subject is looking downward. In column 120, the subject is facing forward. In columns 121 and 122, the subject is looking to the left and in columns 123 and 124, the subject is looking towards the right. Fifteen different poses are associated with these images corresponding to the vertical and horizontal position of the head. In order to generate the images, the subject is photographed while looking in the direction represented by each pose. In order to accommodate different drivers, appearances, and lighting conditions, different subjects would be photographed under different conditions to generate images. Each subject and condition is photographed at all of the fifteen poses.

Figure 4:
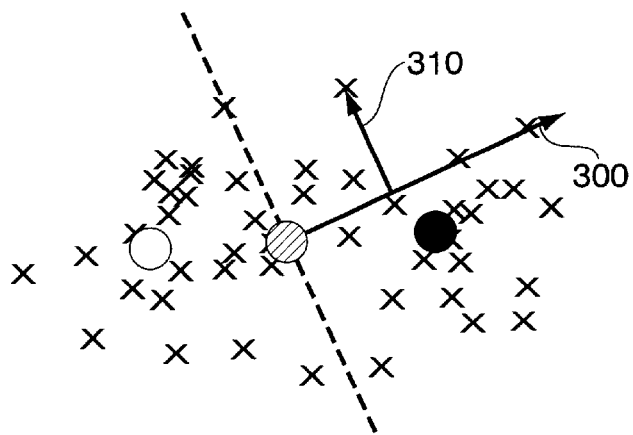
FIG. 4 illustrates one method for dividing images in the training set in order to create the tree structure.

In order to efficiently search through the images in the training set in comparing with a sample image, an index needs to be used with a large set. In order to reduce indexing cost, in one embodiment, the images are organized using a tree-structured vector quantization. At each node 200 in the tree, a code is stored. Indexing involves recursively choosing the child node which has the nearest code to the code of the sample image. The process is repeated until a leaf is reached. The leaf includes one of the images 210 from the training set and the corresponding pose 220 information. In creating the tree-structured vector quantization format, each image is considered to be a vector in n dimensional space, where n is the number of pixels in the image. Thus, each image is an n dimensional code. Techniques for building a tree-structured code book are generally known, follow a recursive form, and are intuitively easy to construct. According to one procedure, the images in the training set are separated into two parts. K-means clustering (K=2) can be used for separating the images into parts. Alternatively, PCA can be used to find the direction of maximal variation of the data sets in the n dimensional space. Each image is then projected onto a weight relative to the direction of maximal variation. As illustrated in FIG. 4, each data point representing an image has a distance 310 from the direction of maximal variation 300. Each data point or image is then assigned to one the two children depending on whether the weight is positive or negative. The process is repeated until the tree-structure is completely formed.

Once the tree-structure is formed, it is stored in the memory 30. When a sample image is obtained by the camera 20, it is also considered a vector in n dimensional space. The code for that vector is used and compared with the nodes in the tree to traverse the tree. The tree is traversed to the leaf node having a code closest to the code for the sample image. The pose 220 corresponding to the image 210 of the leaf node is then outputted through the output 40.

Figure 5:
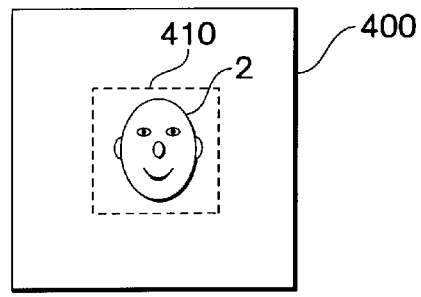
FIG. 5 illustrates a cropping window.
Figure 6:
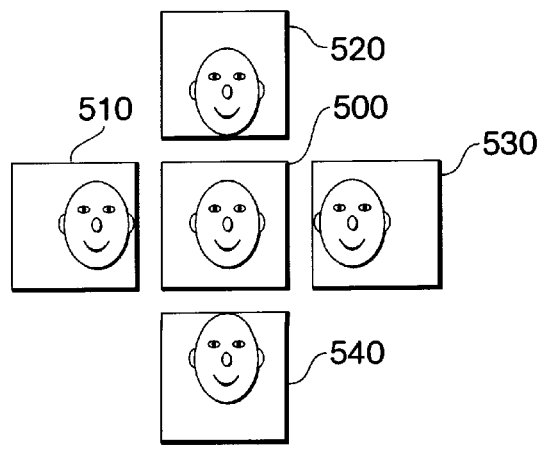
FIG. 6 illustrates images in the training set for adjustment of the cropping window.

In addition to changing head direction, the driver may also spatially move relative to the camera. Since the faces in the images of the training set are centered, erroneous results may occur for images with a face which is not centered. Such movements may be accommodated through the use of a cropping window and additional images in the training set. As illustrated in FIG. 5, a cropping window 410 can be selected out of an image 400 taken by the camera. Preferably, the cropping window 410 is placed so that the face 2 of the subject is centered relative to the cropping window. As the subject moves spatially with respect to the camera image 400, the cropping window 410 needs to move so that the face remains centered. In order to determine movement of the cropping window, additional images are included in the training set as illustrated in FIG. 6. Image 500 represents a subject facing forward without any vertical tilt. This would correspond to the image in column 120 and row 110 of FIG. 2. In addition to this centered image, the training set includes additional images having the same pose with offsets to the right 510, bottom 520, left 530, and top 540. These offset images are included for each pose, subject, and lighting condition. The tree-structure vector quantization method is used with a training set including these additional images. If one of the offset images is determined to be the proper match for the sample image, then the cropping window 410 is moved in order to center the face for the next sample image. For example, if image 510 were the closest image, the cropping window would be moved to the right in order to more closely approximate image 500 for the next sample. FIG. 6 illustrates offsets in four directions. Additional offsets could also be used, such as the diagonal offsets. Furthermore, the size of the cropping window can be adjusted by including images which have larger or smaller faces relative to the image size. Thus, the system can accommodate movement of the subject toward or away from the camera 20. Other types of transformations could also be accomodated through use of the cropping window. For example, tilt of the head could be compensated for by changing the tilt of the cropping window.

In one implemented embodiment, the training set includes eleven subjects, at 15 poses, with 7 images per pose (those shown in FIG. 6, and a larger and smaller face image) for tracking in position and scale. Each image consists of 40×30 pixels with one byte representing the gray scale level of the pixel. This system requires 1.4 Mb of storage for the training set. Once the tree-structure is developed, the system is able to traverse the tree to determine a pose for persons not in the training set on a 1995 SGI Indy workstation at the rate of 11 frames per second. This example only used one lighting condition. Preferably, additional subjects would be used in the training set, with additional lighting conditions. Additional memory space may be saved by reducing the size of the images in the training set. Although a 40×30 pixel image was used in the tested embodiment, the size of the heads were much smaller, roughly 16×16 pixels. Furthermore, the processing time for additional images would not increase greatly. With the tree-structure, the number of comparisons to find a leaf node is $\log_2$ (number of images). Thus, each time the number of images in the training set doubles, a single additional comparison is required. A training set using 25 subjects under 4 lighting conditions would require 2.6 Mb storage space, and 6 comparisons to traverse the tree to obtain the closest image and pose. Thus, the storage and processing requirements meet the objectives of being quick and economical.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A method for determining a pose of a subject comprising the steps of:
   organizing a plurality of images in a searchable tree structure, each image being associated with at least one parameter representing a pose, the step of organizing includes the steps of:
     determining a direction of maximal variation of the plurality of images; and
     separating the plurality of images into at least two subsets according to a comparison of each image to the direction of maximal variation;
   taking a picture of the subject to generate a sample image;
   traversing the searchable tree structure to locate one of the plurality of images which is closest to the sample image; and
   outputting the at least one parameter associated with the one of the plurality of images as the pose.

2. The method of claim 1, wherein the organizing step further includes the steps of:
   determining a vector code for each of the plurality of images;
   wherein the step of determining the direction of maximal variation includes determining a direction of maximal variation based upon the vector codes for the images;
   wherein the step of separating includes separating the plurality of images into two subsets of images based upon the relative positions of the vector codes for the images and the direction of maximal variation;
   setting the direction of maximal variation as a node of the tree; and
   setting each of the subsets of images as branches of the tree from the node.

3. The method of claim 2, wherein the organizing step further includes the steps of:
   determining a direction of maximal variation based upon the vector codes for the images in each subset;
   separating the images of a subset into two lower subsets of images based upon the relative positions of the vector codes for the images and the direction of maximal variation;
   setting the direction of maximal variation as a subset node of the tree; and
   setting each of the lower subsets of images as branches of the tree from the subset.

4. The method of claim 1, wherein the taking step includes the steps of:
   generating a first image of the subject; and
   selecting a portion of the first image to generate the sample image.

5. The method of claim 4, wherein said outputting step includes outputting a transformation parameter representing a transformation of a subject of the image relative to at least one of a defined position, scale and orientation of the image; and wherein said selecting step includes selecting a portion of the first image based upon a previously output transformation parameter.

6. The method of claim 1, further comprising the steps of:
   taking photographs of a plurality of subjects, each in a plurality of poses to generate the plurality of images; and
   associating at least one parameter representing a pose of the subject with each of the plurality of images.

7. The method of claim 1, wherein the pose represents a direction that the head of the subject is facing.

8. The method of claim 1, wherein the step of separating includes the steps of:
   comparing each of the plurality of images to the determined direction of maximal variation to obtain a weight for each image having a positive or negative sign; and
   separating the plurality of images into at least two subsets according to the sign of the weight for each image.

9. An apparatus for determining a pose of a subject comprising:
   a memory for storing a tree structure, each leaf of the tree structure including one of a plurality of images and at least one parameter representing a corresponding pose, the tree structure constructed such that images are separated into at least two subsets according to a comparison of each image to a direction of maximal variation of the plurality of images;
   a camera generating a sample image of the subject;
   traversing means for traversing the tree structure in the memory based upon the sample image to determine one of the plurality of images which is closest to the sample image; and
   outputting means for outputting at least one parameter corresponding to the closest image.

10. The apparatus of claim 9, wherein
    the camera generates a series of sample images,
    the traversing means traverses the tree structure once for each sample image in the series to determine an image closest to each sample image; and
    the outputting means outputs a series of at least one parameter corresponding to the closest images to the series of sample images.

11. The apparatus of claim 9, wherein the at least one parameter includes a transformation parameter representing a transformation of a subject of the image relative to one of the image; and
    wherein said camera includes:
      means for generating a first image;
      means for selecting a portion of the first image as a sample image based upon a transformation parameter outputted for a prior sample image in the series of sample images.

12. The apparatus of claim 9, wherein the plurality of images include at least one image for each of a plurality of subjects in each of a plurality of poses.

13. The apparatus of claim 9, wherein the plurality of images include at least one image for each of a plurality of subjects under a plurality of lighting conditions.

14. The apparatus of claim 9, further comprising:

a memory for storing the plurality of images and a corresponding plurality of at least one parameter representing a pose of a respective image; and tree generation means for generating and storing the tree structure based upon the plurality of images.

15. The apparatus of claim 14, wherein the tree generating means includes:

means for determining a vector code for each of the plurality of images;

means for determining a direction of maximal variation based upon the vector codes for the images;

means for separating the plurality of images into two subsets of images based upon the relative positions of the vector codes for the images and the direction of maximal variation;

means for storing the direction of maximal variation in the memory as a node of the tree; and means for setting each of the subsets of images as branches of the tree from the node.

16. The apparatus of claim 15, wherein the tree generating means further includes:

means for determining a direction of maximal variation based upon the vector codes for the images in each subset;

means for separating the images of a subset into two lower subsets of images based upon the relative positions of the vector codes for the images and the direction of maximal variation;

means for storing the direction of maximal variation in the memory as a subset node of the tree; and means for setting each of the lower subsets of images as branches of the tree from the subset.

17. The apparatus of claim 9, wherein each of the plurality of images has a weight based upon a comparison between the image and the determined direction of maximal variation, wherein each weight has a positive or negative sign and wherein the images are separated into at least two subsets according to the sign of the weight for each image.

* * * * *